United States Patent [19]

Ichii

[11] 3,994,006

[45] Nov. 23, 1976

[54] FILM FORWARDING MECHANISM
[75] Inventor: Hirokazu Ichii, Omiya, Japan
[73] Assignee: Fuji Photo Film Co., Ltd., Minami-ashigara, Japan
[22] Filed: Aug. 20, 1975
[21] Appl. No.: 606,257

[30] Foreign Application Priority Data
Aug. 21, 1974  Japan................................ 49-96309

[52] U.S. Cl................................ 354/212; 354/85; 354/171; 354/173
[51] Int. Cl.²......................................... G03B 1/02
[58] Field of Search.................. 354/83, 84, 85, 86, 354/178, 179, 212, 319, 171, 172, 173

[56] References Cited
UNITED STATES PATENTS

| | | | |
|---|---|---|---|
| 3,511,152 | 5/1970 | Erlichman............................ | 354/319 |
| 3,678,830 | 7/1972 | Erlichman............................ | 354/86 |
| 3,757,657 | 9/1973 | Eloranta et al........................ | 354/86 |
| 3,868,709 | 2/1975 | Douglas............................... | 354/212 |
| 3,936,850 | 2/1976 | Goto................................... | 354/212 |

Primary Examiner—L. T. Hix
Assistant Examiner—Alan Mathews
Attorney, Agent, or Firm—Sughrue, Rothwell, Mion, Zinn & Macpeak

[57] ABSTRACT

Film forwarding mechanism comprising a reciprocally slidable plate carrying pawl to engage and forward film. The plate is normally held at a first position, is released subsequent to camera shutter action, moved to and held at an intermediate position until released therefrom by action of a rotary drive mechanism, moved to a second position, then moved by the drive mechanism from the second position to the first position, the pawl forwarding film during plate movement from the second to the first position.

4 Claims, 6 Drawing Figures

FILM FORWARDING MECHANISM

BACKGROUND OF THE INVENTION

1. Field of the Invention

The present invention relates to a film forwarding mechanism, and more particularly to a film forwarding mechanism having a reciprocating pawl to effect forwarding of successive units of film.

2. Description of the Prior Art

In a camera employing film in the form of individual units which are successively and independently developable by the so-called diffusion-transfer process effected by pressing means within the camera and then moved in the form of completed prints exterior of the camera, normally film units are initially contained in a pack which is loaded in the camera, and from which, at each successive exposure of a film unit, it is necessary to move the single exposed film unit and bring the film unit into engagement with processing rolls, for example, which are provided in the camera, but are exterior to the film pack, and apply pressure on the film unit to cause spread of a processing solution therethrough and development of the photographic image carried by the film unit, while the film unit is moved to the exterior of the camera, either by the processing rolls themselves or by other means. It has been known to effect such movement of a film unit entirely by manual means, for example by gear means actuable by a knob or knobs provided externally on the camera, or by a leader, or strip of paper, which is attached to the film unit and extends from the film pack to the exterior of the camera. However, such means have a main disadvantage that it is difficult to ensure that a film unit is moved through processing rolls at a required speed to ensure correct development of the image carried thereby, while there is also the inconvenience of difficulty of manipulation, and, if leaders are employed, of mounting a film pack in a camera. Accordingly it is generally preferred to effect such movement of a film unit automatically by means actuated in association with the camera shutter release means.

Conventionally, this automatic forwarding of film units may be effected by friction rolls which are provided in a camera in a position to contact successive film units to be forwarded from a film pack, to the processing rolls, or by a reciprocating pawl means which extends through a suitable slot formed in a film pack and may engage an edge portion of and draw out each successive exposed film unit. Film units being comparatively sensitive elements application of excessive pressure thereon is not permissible. Consequently, when friction rolls are employed to forward film units it is somewhat difficult to specify exact values of pressure to be applied by the rolls in order to ensure correct forwarding of film units but also avoid harm to photosensitive portions thereof, and since it is general practice to assign values of pressure including a safety margin to avoid harming film units, there may be problems of failure of friction rolls to forward film units completely out a pack. For this reason it is generally preferred to employ a film forwarding means comprising a reciprocally moveable pawl means, which engages comparatively strong edge portions only of film units and may always apply sufficient force to forward film units completely from a pack, such a pawl means being moved to a start position wherein it engages the edge portion of an exposed film unit, then moved in a straight line, simultaneously moving the exposed film unit out of the film pack, to an end position, the exposed film unit being brought into full engagement with processing rolls or similar means by the time the pawl means reaches the end position, and the pawl means being subsequently returned to the start position whereat it may engage an edge portion of the next film unit in the pack to be exposed. The drive for such a pawl means is conventionally a rotary drive, for example, by an electrical or spring motor provided in the camera, which is converted in a suitable manner to a linear drive, and stopping position of the rotary drive means must be accurately controlled, since otherwise there is a possibility of the pawl means forwarding two film units, one exposed and the second unexposed, in immediate succession from the film pack, or of the pawl means being prevented by the drive means from returning to the start position before being again moved to the end position, with the result that an exposed film unit fails to be forwarded. Such control is difficult, and if effected demands employment of precision means which are expensive.

It is accordingly an object of the invention to provide a film forwarding mechanism which is automatically actuated upon termination of a camera shutter release action.

It is another object of the invention to provide a film forwarding mechanism which comprises a moveable pawl element reciprocally moveable in a straight line for moving film forward in a required manner, and a rotary drive means for driving said pawl element, and ensures correct actuation of said pawl element but does not require provision of precision control means for controlling action of said drive means.

It is a further object to provide a film forwarding means having a simple and inexpensive construction.

SUMMARY OF THE INVENTION

In achieving these and other objects there is provided, according to the present invention, a film forwarding mechanism comprising a slide plate which is reciprocally moveable between a first position and a second position, carries a pawl element for engagement of and forwarding film and is constantly urged to the second position whereat the pawl element carried thereby engages a film unit in an initial position, and a rotary drive means which while travelling over part of its rotatory path may move the slide plate from the second position to the first position, during which movement the pawl element moves the film unit a required distance out of the pack, and into engagement with processing rolls for example.

Needless to say the forwarding mechanism is equally employable in association with a camera containing roll film, in which case the pawl element engages a perforation in the film and advances the film a distance equal to the length of one frame thereof.

There is also provided a first retainer means and a second retainer means. The first retainer means normally, i.e., between exposure of successive film units, retains the slide plate at the first position, and is caused to disengage the slide plate subsequent to actuation of the camera shutter, whereby the slide plate is allowed to commence moving towards the second position, the slide plate being, however, stopped by the second retainer after moving only a very short distance in this direction. When reaching a certain point in its rotary travel, the rotary drive means, which is actuated at this stage, causes the second retainer to disengage the slide plate, which is thereupon moved completely to the second position. The point at which the rotary drive means thus causes disengagement of the second retainer is suitably such that the drive means must travel at least half a revolution before moving forward, i.e. before moving along that part of its path over which it may move the slide plate from the second position to the first position, and rotational speed of the drive means is made such that the slide plate may be moved completely to the second position before the drive means reaches this portion of its path. In other words, since the slide plate is held by the first retainer each time it reaches the first position, only one film unit is advanced at a time, even if the drive means continues rotating after forwarding of an exposed film unit is completed, and the second retainer ensures that movement of the slide plate to the second position does not occur simultaneously with forward travel of the drive means thus avoiding the possibility of failure of an exposed film unit or frame being forwarded. There is thus provided an efficient film forwarding mechanism requiring minimum electrical equipment. In practice, the motor means for actuation of the drive means may of course be the same motor means which is employed to drive processing rolls in the camera.

A better understanding of the present invention may be had from the following full description thereof when read in conjunction with the attached drawings, in which like numbers refer to like parts, and

DESCRIPTION OF THE PREFERRED EMBODIMENT

Before proceeding with the description it is to be noted that although the description is taken in reference to employment of the means of the invention in forwarding diffusion-transfer type film units, the means is equally adapted to forwarding of perforated roll film, as noted above.

Figure 1:
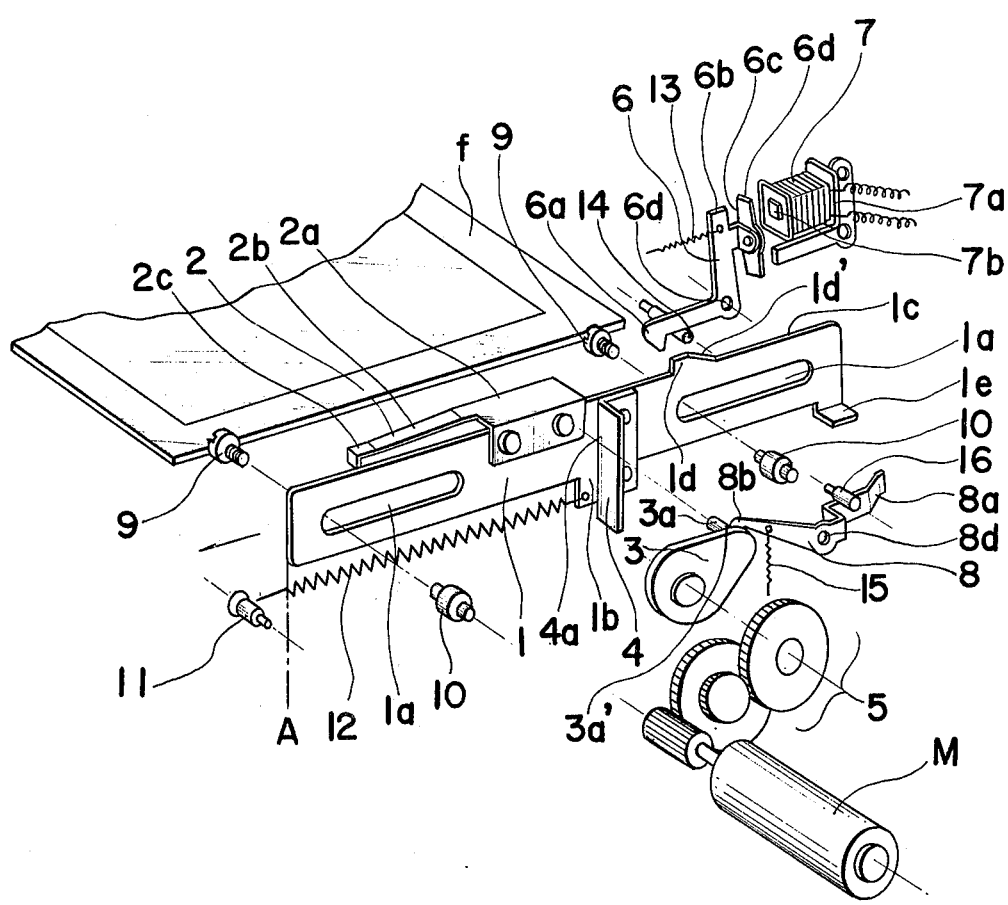
FIG. 1 is an exploded view of a film forwarding mechanism according to one embodiment of the invention, said mechanism being shown in a first position wherein it is retained subsequent to forwarding of a film unit.
Figure 2:
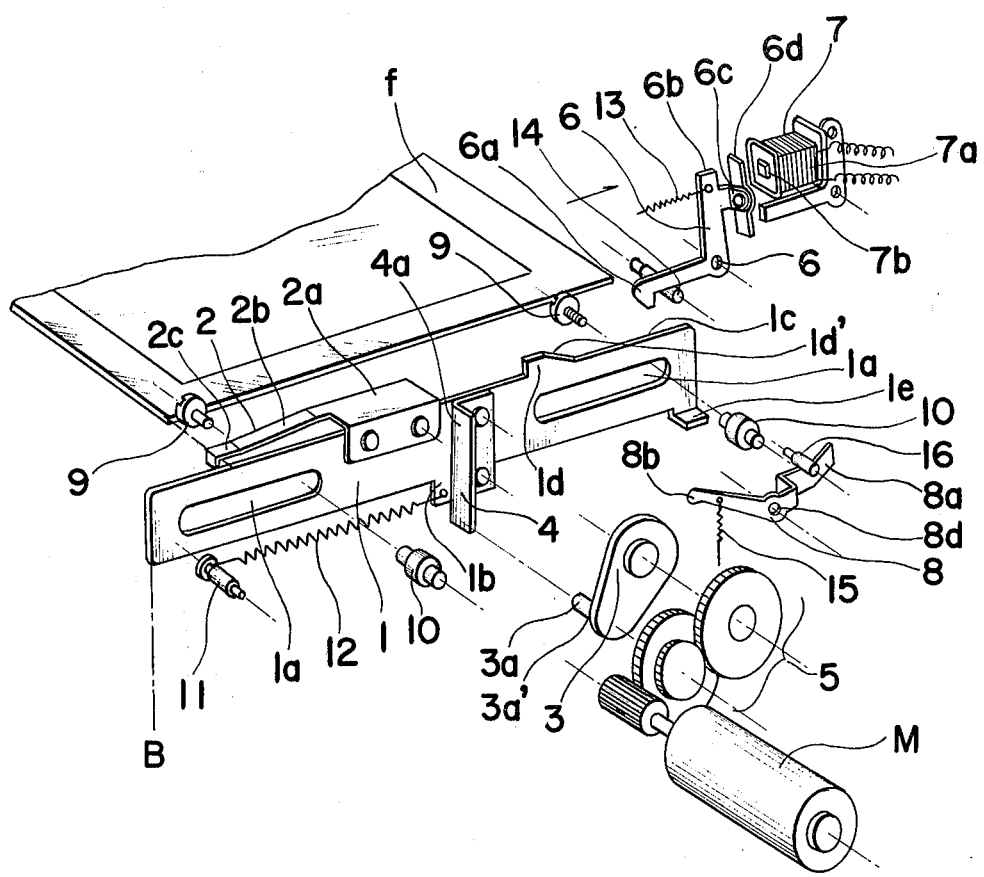
FIG. 2 is an exploded view showing the mechanism of FIG. 1 at a second position whereat it engages a exposed film unit.

Referring to FIGS. 1 and 2, there is shown a slide plate 1 having main portion in the form of a comparatively long, generally rectangular plate in which there are formed two elongated slots 1a which have major axis disposed along the longitudinal axis of the slide plate main portion, and through each of which passes a guide stud 10 affixed to a camera interior portion (not shown in the drawings) by a screw 9, for example, the studs 10 serving to guide the slide plate 1 in linear reciprocal motion between a first position A and second position B, which are respectively rightmost and leftmost positions as seen in the drawings, the slide plate 1 being shown at the first position A in FIG. 1 and at the second position B in FIG. 2. The slide plate 1 carries a forwarding pawl 2 comprising a plate portion 2a which is fixedly attached to an edge portion of and extends at right-angles from the slide plate 1, and an arm portion 2b which is integrally attached to the plate portion 2a, is very slightly flexible, and extends in a line generally parallel to the longitudinal axis of the slide plate 1, and a hook end portion 2c, which is bent at the outer end of the arm portion 2b with a certain length enough to engage an edge portion of one film unit and being always urged to move downwards by means of its resilient force, is brought into a position for engagement of an edge portion of an exposed film unit f when the slide plate 1 is at the second position B, FIG. 2, and draws the film unit f out of a pack (not shown in the drawings) when the slide plate 1 is moved from the second position B, FIG. 2, to the first position A, FIG. 1. Fixedly attached to a generally central portion of the slide plate 1 there is an angle piece 4 which is normal with respect to the longitudinal axis of the slide plate 1, and one wall 4a of which extends outwards at right-angles to the surface of the plate 1 and constitutes a contact plate. The contact plate 4a may be contacted by a pin 3a projecting from an outer end surface portion of a rotatably mounted crank plate 3, which may be rotated by a motor M acting through a suitable gear train 5, the crank plate 3 being rotated counterclockwise as seen in the drawings. During part of the rotation of the crank plate 3 the pin 3a attached thereto is brought into contact with and pushes the contact plate 4a whereby the slide plate 1 may be moved to the 1st position A. During this action, a small inner end portion 3a' of the pin 3a, i.e., the portion thereof nearest to the crank plate 3, does not contact the contact plate 4a. The slide plate 1 is constantly urged to the second position B by a tension spring 12 having one end attached to a small integral, downward extension 1b formed at a generally central portion of the plate 1, and the other to a fixed pin 11 mounted in a camera wall portion (not shown in the drawings). Formed on the upper edge of the slide plate 1, near the right-hand end thereof in FIGS. 1 and 2, there is a small upwardly extending first catch projection 1d, the right side 1d' of which being gradually sloped down to the upper edge of the slide plate 1 while the left side of which is sharply cut so as to be able to engage an arm 6a of a first retainer. Projecting sideways from the lower right-hand corner portion of the plate 1 there is a small second catch projection 1e which extends outwards at right-angles to the surface of the plate 1. The first catch projection 1d and second catch projection 1e are respectively engageable by first retainer 6 and a second retainer 8.

Still referring to FIGS. 1 and 2, the first retainer 6 comprises two arms 6a and 6b, which are at approximately right-angles to one another, and is pivotally mounted at the junction 6d of the arms 6a and 6b to a camera wall portion (not shown in the drawings). One end of a tension spring 13 whose other end is attached to a camera wall portion is attached to an upper end portion of one arm 6b, the spring 13 exerting a constant force to pivot the first retainer 6 counterclockwise until the other arm 6a thereof is brought into contact with a fixed stop stud 14 secured to a camera wall portion. When the first retainer 6 is in this position as shown in FIG. 1 a hook portion 6a' formed at the end of the arm 6a thereof may engage the first catch projection 1d of the slide plate 1, which is thereby retained at the rightmost first position A. Formed in integral attachment to the retainer arm 6a there is a projecting support 6c on which is mounted a plate 6d made of magnetic material. Adjacent to the plate 6d there is provided an electromagnet 7 comprising a winding 7a and iron core 7b. Subsequent to termination of shutter release action, current is passed through the winding 7a by means (not shown), whereupon the core 7b exerts an attractive force on the plate 6d and the first retainer 6 is pivoted clockwise, counter to the force of the spring 13, out of a position for retention of the slide plate 1. Upon termination of current flow through the coil 7a, the spring 13 returns the first lever 6 to its original position.

The second retainer 8 comprises two arms 8a and 8b which are slightly inclined with respect to one another, and is pivotally mounted at the junction 8d of the arms 8a and 8b in a camera wall portion. The retainer arm 8b has attached thereto one end of a tension spring 15 whose other end is attached to a camera wall portion (not shown) and which exerts a constant force urging the second retainer 8 counterclockwise until the other arm 8a thereof is brought against a fixed stop stud 16 secured to a camera body, in which situation as shown in FIG. 1 the outer end of the arm 8a is in a position to be contacted by the second catch projecton 1e of the slide plate 1, whereby the slide plate 1 may be retained at an intermediate position C which is a very small distance from the first position A. During rotation of the crank plate 3, when the pin 3a thereof is at, or has just passed its rightmost position, the inner end portion 3a' of the pin 3a is brought into contact with the outer end of the second retainer arm 8b, whereby the second retainer 8 is pivoted clockwise slightly, counter to the force of the spring 15, and releases the slide plate 1.

Reference is now had to FIG. 3(a) through 3(d) which is a series of drawings illustrating action of the abovedescribed means. Between successive shots taken in the camera, the slide plate 1 is retained at the first position A by the first retainer 6, as shown in FIG. 3(a), the pawl 2 therefore being out of engagement with an edge portion of the next film unit f for production of a photograph and being flexed slightly against a surface portion of this film unit f. In FIG. 3(b), after completion of shutter release action, the electromagnet 7 is energized, whereby the first retainer 6 is caused to release the slide plate 1, and rotation of the crank wheel 3 is commenced by means of a conventional electric circuit (not shown in the drawings). The slide plate 1, being released, is moved leftwards until the catch projection 1e thereof comes into contact with the arm 8a of the second retainer 8, which therefore retains the slide plate at the intermediate position C.

Figure 3:
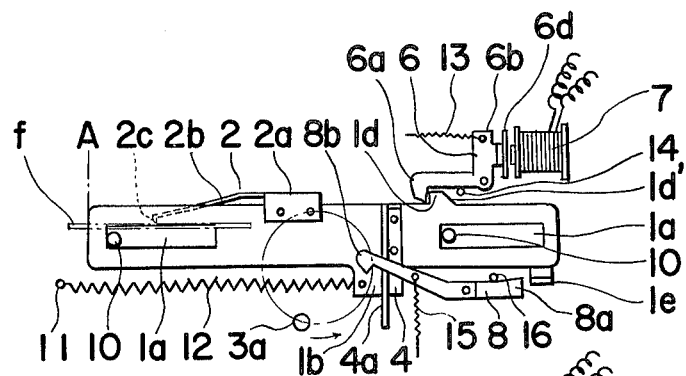
FIGS. 3(a) through 3(d) are sequential, elevation views illustrating the action of the mechanism of FIG. 1.
Figure 3:
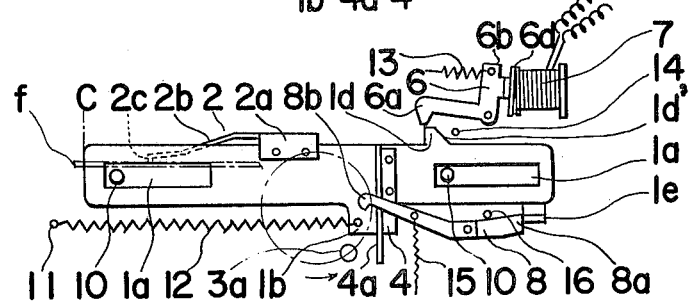
Figure 3:
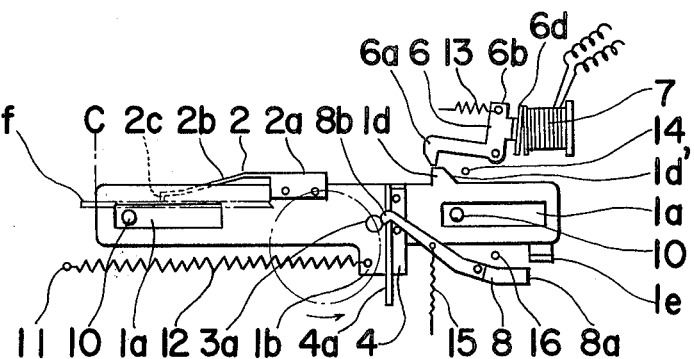
Figure 3:
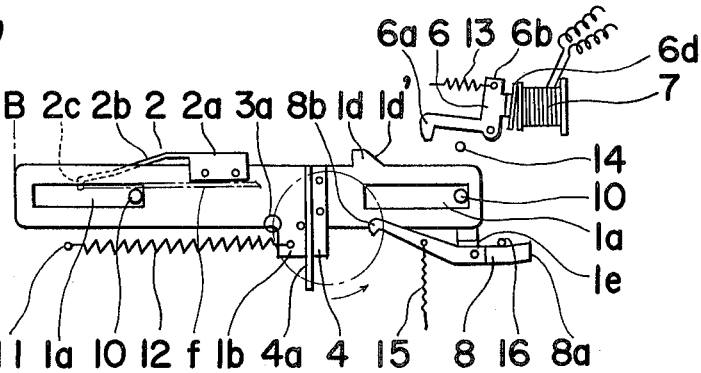

In FIG. 3(c), as the crank plate 3 continues to rotate, the inner end portion 3a' of the pin 3a thereof causes the second retainer 8 to release the slide plate 1, which may therefore be drawn completely to the second position B by the spring 12. The slide plate 1 is moved from the intermediate position C to the second position in accordance with the leftwards movement of the pin 3a with which the contact plate 4a of the angle piece 4 is always in contact by the tension force of the spring 12. During this movement of the slide plate 1 the pin 3a also is moving leftwards and so does not constitute a hindrance to the slide plate 1, it being simply necessary for leftward motion of the pin 3a to be slightly faster than that of the slide plate 1, and the pawl 2 is slightly flexed against and is sliding on a surface portion of this film unit f. In FIG. 3 (d), when the slide plate 1 reaches the second position B, the engaged pawl 2 slips down from a surface portion of the film unit by means of its resilient force over an edge portion of the film unit f.

The crank plate 3 continues to rotate, and the pin 3a thereof causes the slide plate 1 to move from the second position B to the first position A, the pawl 2 simultaneously drawing the film unit f out of the film pack. During this movement of the slide plate 1, the electromagnet 7 is de-energized, whereby the first retainer 6 is returned to its normal position by the spring 13, and when the slide plate 1 reaches the first position A it is retained in that position, as shown in FIG. 3(a). Since the slide plate 1 is now retained at the first position A and remains in this position until the next photograph is taken, the crank plate 3 may continue to rotate without there being any risk of the slide plate 1 being actuated to cause forwarding of an unexposed film unit. In other words, as well as it being ensured that the slide plate 1 may move completely to a position to permit engagement of film unit ready for forwarding, it is also permitted to stop the crank plate 3 in any position, it being thereby possible to dispense with precision means for control of this latter element. During this movement of the slide plate 1 the pin 3a must not trip retainer 8 before passing its rightmost position since otherwise the pin 3a rightward travel would be simultaneous with leftward travel of the slide plate 1. Before tripping retainer 8, pin 3a moves the slide plate 1 to its rightmost position wherein it can be engaged by retainer 6. Therefore electromagnet 7 must be energized at this time, since otherwise plate 1 would be retained in its rightmost position by retainer 6. On the other hand, once the slide plate 1 has been allowed to move to its leftmost position, the electromagnet 7 must be de-energized to permit retainer 6 to return to an engagement position before the slide plate 1 is again moved to its rightmost position. Therefore control of electromagnet 7 must be very precise.

If the film unit employed is of a type which is to be forwarded out of a film pack immediately upon completion of exposure, the electromagnet 7 may, of course, be replaced by a simple mechanical element, for example a pivotal trip lever, which connects to the camera shutter release mechanism, and is actuated to pivot the first release lever clockwise slightly immediately at the end of shutter action. However, if the film unit is of the type such as that a film unit comprises a pair of sheets which constitute a sealable envelope, and are provided in a rear part of a film pack, and a photosensitive sheet which is exposable to form a latent image, is initially provided separately from the pair of sheets in a forward portion of the film pack, and after exposure is transferred into the envelope formed by the other two sheets, thereby constituting a complete film unit ready for forwarding from the pack, there needs to be a slight delay between completion of exposure and actuation of a film forwarding means. Supposing this type of film unit to be employed, if, after forwarding of a film unit, the crank plate 3 happened to be stopped exactly in the position shown in FIG. 3(c), i.e in the position in which the pin 3a pivots the second retainer 8 out of a position for engaging the slide plate 1, if a mechanical element for causing the first retainer to release the slide plate 1 were employed, the slide plate 1 would be moved to the second position B and forwarding action could commence before complete transfer of the exposed photosensitive sheet into the envelope constituted by the pair of other sheets. If, however, the electromagnet 7 is employed and associated with a simple delay means, this problem is easily overcome.

While a specific embodiment of the invention has been described and shown, variations within the scope of the claims are possible and are contemplated. There is therefore no intention of limitation to the exact details shown and described.

What is claimed is:

1. In a camera housing film and comprising an optical system for direction of image-wise light to expose said film in said camera and shutter means actuable to permit exposure of said film and a film forwarding mechanism, said film forwarding mechanism comprising;

slide plate means reciprocally moveable between a first position and a second position, said first position being reached by said slide plate means upon termination of a film forwarding action and said second position being reached thereby at commencement of a film forwarding action;

engagement means carried by said slide plate means, for engaging an engagement portion of film when said slide plate means is at said second position to forward film during movement of said slide plate means from said second position to said first position;

first retainer means normally positioned to retain said slide plate means at said first position;

release means actuable to disengage said first retainer means from said slide plate means subsequent to termination of action of said shutter means;

spring means exerting constant force urging said slide plate means to said second position;

second retainer means normally positioned to retain said slide plate means in an intermediate position adjacent to said first position subsequent to release thereof from said first retainer means, whereby movement of said slide plate means towards said second position is temporarily prevented; and rotary drive means, said rotary drive means being actuated subsequent to termination of said shutter means and which when actuated first causes second retainer means to release said slide plate means, whereby said slide plate means moves to said second position, and then causes said slide plate means to move from said second position to said first position, whereby film is forwarded by said engagement means.

2. Film forwarding mechanism as recited in claim 1, wherein said slide plate means includes means defining a rib portion contactable by said rotary drive means, a first projection portion and a second projection portion which are engageable by said first retainer means and said second retainer means, respectively, and wherein each of said retainer means has the general form of a lever element, is pivotally mounted about a generally central point thereof, defines an end portion for engaging a corresponding projection portion of said slide plate means, and has associated therewith a stop means contactable by said retainer means and defining said engagement position of said retainer means and wherein spring means constantly urges said retainer means into contact with said stop means.

3. Film forwarding mechanism as recited in claim 1, wherein said first retainer means has attached thereto a plate element made of magnetic material and said release means comprises an electromagnet energizable subsequent to termination of action of said shutter means to attract said plate element, whereby said retainer means is moved in a direction to disengage said slide plate means.

4. Film forwarding means as recited in claim 1, wherein said release means comprises a pivotal lever element connected to and actuable with said shutter means.

* * * * *